United States Patent
Cook (10) Patent No.: US 7,580,884 B2
(45) Date of Patent: Aug. 25, 2009

(54) COLLECTING AND AGGREGATING CREDITWORTHINESS DATA

(75) Inventor: Scott D Cook, Woodside, CA (US)

(73) Assignee: Intuit Inc., Mountain View, CA (US)

( * ) Notice: Subject to any disclaimer, the term of this patent is extended or adjusted under 35 U.S.C. 154(b) by 1702 days.

(21) Appl. No.: 09/892,223

(22) Filed: Jun. 25, 2001

(65) Prior Publication Data

US 2002/0198824 A1    Dec. 26, 2002

(51) Int. Cl.
*G06Q 40/00* (2006.01)
(52) U.S. Cl. .......................................... 705/38; 705/35
(58) Field of Classification Search ................. 705/38, 705/35, 75
See application file for complete search history.

(56) References Cited

U.S. PATENT DOCUMENTS

2002/0111901 A1    8/2002    Whitney

2003/0018549 A1    1/2003    Fei et al.
2003/0154405 A1    8/2003    Harrison

OTHER PUBLICATIONS

Predictive collection score technology Michael J Banasiak, Gerard L Kiely. Business Credit. New York: Feb. 2000. vol. 102, Iss. 2; p. 18, 3 pgs.*
Small Isn't All When It Comes to Creating Jobs; [Final Edition] Steven Pearlstein. The Washington Post (pre-1997 Fulltext). Washington, D.C.: Jul. 28, 1993. p. D.01.*
This is your financial life Bank accounts, credit card balances, insurance and investments—soon you will be able to call them up on one screen, says Paul Farrow Paul Farrow. The Sunday Telegraph. London (UK): May 20, 2001. p. 04.*
PCT International Search Report of PCT/US02/19790.

* cited by examiner

*Primary Examiner*—Lalita M Hamilton
(74) *Attorney, Agent, or Firm*—Osha • Liang LLP (57)    ABSTRACT

Transaction data is uploaded from client machines running a software application such as an accounting or financial software application. Uploaded data describes transaction history with respect to subject companies. A central server aggregates the uploaded data to generate and distribute reports and/or alerts containing creditworthiness assessments of the subject companies.

38 Claims, 7 Drawing Sheets

COLLECTING AND AGGREGATING CREDITWORTHINESS DATA

BACKGROUND OF THE INVENTION

1. Field of the Invention

The present invention is related to creditworthiness data collection and aggregation, and more particularly to collecting payment history data from a large number of users by uploading data directly from installed financial or accounting software applications, aggregating such data at a central location, and generating reports and/or alerts based on the aggregated data.

2. Description of the Background Art

Assessments of creditworthiness are valuable in many business-related situations. Businesses often extend credit to other firms and/or individuals, for example by selling goods or services and billing the purchaser via an invoice for later payment. Creditors, such as vendors of products or services, wish to avoid extending credit to individuals and business entities that are likely to default on their obligations. Accordingly, most creditors perform some form of "credit check" on a potential debtor (e.g., a customer) before extending credit. Such credit checks are also performed in other situations where it is desirable to investigate the overall trustworthiness and/or ability to pay of an individual or business entity (referred to herein as a "subject company").

Conventionally, a creditor performs a credit check by consulting a trusted provider of credit information, such as Dun & Bradstreet. At the creditor's request, the provider generates a credit report or other document that summarizes the credit history of a subject company. Based on the credit report, the creditor evaluates the creditworthiness of the subject company, and thereby makes business decisions as to whether and to what extent to extend credit to the subject company.

Credit reports generated by providers such as Dun & Bradstreet are typically based on large amounts of creditworthiness data that have been collected over a period of time. Such creditworthiness data may be based, for example, on publicly available records such as bankruptcy filings, liens, judgments and the like, summaries of the type of business and length of time the business has been in operation, complaints or comments from other vendors, and the like. In general, the creditworthiness data that is used by credit information providers is only as reliable as the techniques employed for collecting the data. To the extent that such data is collected indirectly or that the data collection relies on the efforts of individuals to accurately report their observations and interactions, the data is subject to inaccuracies. In addition, to the extent that such data is unavailable, such as for small companies or those that have not been in business a long time, the creditworthiness report may not be accurate or may not be available. Also, credit reports from providers such as Dun & Bradstreet typically attempt to cover payment behavior of businesses and fail to cover that of consumers.

Payment history is a particularly good indicator of creditworthiness, and many creditors rely on a subject company's payment history, as reported by others, in determining whether to extend credit to the company. Accordingly, credit information providers regularly obtain payment history data from vendors and other creditors, as part of their creditworthiness data collection efforts.

Conventionally, due to practical limitations, it is not feasible to collect data for every payment, or even for a large subset of payments, made by a particular subject company. Therefore, credit information providers typically collect payment history data from a subset of vendors who have dealt with the subject company. These vendors themselves do not typically report transaction-level payment data, but rather provide aggregated information about the subject company's payment patterns (e.g., number of times 30 days late). Such data is then further aggregated and extrapolated by the credit information provider in order to develop an assessment of the subject company's overall payment performance. Since the experiences of the vendor subset may not be representative of the overall behavior of the individual or company, and since in many cases the total quantity of available data for a subject company may be limited, the resultant report may suffer from inaccuracies.

What is needed, then, is a technique for expanding the scope of data collection for credit history data, so as to improve the accuracy and reliability of resultant creditworthiness reports.

What is further needed is a technique for collecting payment history data in an automated fashion, directly from vendors or other business entities, and without introducing subjective assessments of payment history, so as to further improve the accuracy and reliability of creditworthiness reports.

SUMMARY OF THE INVENTION

The present invention collects payment history data from a large number of users, such as vendors, by uploading data from stored files of financial or accounting software packages. In one embodiment the users are unaffiliated with one another; they are, for example, separate individuals and/or businesses that do not normally share transaction data with one another. Collected data is then aggregated at a central location in order to generate credit history reports and creditworthiness assessment reports and alerts for various subject companies whose payment transactions or patterns are reflected in the collected data.

In one aspect of the invention, financial or accounting software packages running on users' computers periodically upload accounts receivable data to a central server. The uploading may be performed over a network such as the Internet. Data is uploaded automatically, and in one embodiment is performed in an anonymous manner that protects the confidential information of the user. The uploaded information for each subject company is then aggregated, and a determination of each subject company's creditworthiness is made. The creditworthiness information, along with underlying transactional or summary information, may be provided to the users or to others in the form of credit reports.

In one embodiment, the invention may seek to obtain the user's consent prior to commencing uploads. In exchange for providing such consent, the invention may allow the user to access credit reports on subject companies for free or for a discounted fee.

Uploaded accounts receivable data may include, for example, billing and payment dates for subject companies, aging histories, and other data that is typically available to users of financial or accounting software packages, or that is generated by such packages in the form of reports and charts.

In another aspect of the invention, credit reports on subject companies are made available to users of the financial or accounting software packages. Such credit reports may be based on the collected and aggregated creditworthiness data, and may be provided to users via the Internet. For example, a report may be made available to a user via a web page or within the context of the financial or accounting software package. The report may be customized to the user's needs, for example by presenting data for those subject companies that are of particular relevance to the user. Reports may be made available for a fee, and appropriate discounts or complimentary reports may be made available for those users that allow their accounting data to be collected.

Credit reports generated by the present invention may be presented in any desired format, including formats that are known in the art for presenting creditworthiness data. In addition, creditworthiness data may be presented to users of financial or accounting software in a manner that integrates presentation of the data with other functionality of the software. For example, when the user enters a transaction containing the name of a particular company, the software may present an indicator of the relative creditworthiness rating of the company. An icon representing the rating may be displayed on the transaction screen, and the user may be given the opportunity to click on the icon to obtain a more detailed report. In addition, the system of the present invention may automatically notify users when a rating for a company changes, particularly if the user does business with the company, has previously requested a report for the company, or has otherwise indicated an interest in the credit rating of the company; such notifications may be provided as an alert box within a software application, or via e-mail or website, or by other means. Thus, the present invention allows credit reports to be customized to particular users, by presenting them with information relevant to the particular companies with whom they do business.

The present invention thus avoids the limitations discussed above with respect to prior art schemes for collecting and aggregating creditworthiness data. In particular, payment history and other creditworthiness data are collected in a more widespread fashion, more reliably, and with a minimum of user effort. Aggregated creditworthiness data collected at a central server may be updated in real time, as payment history data is received from users.

By interfacing with a widely distributed financial/accounting software application, such as QuickBooks® by Intuit® Inc., the present invention takes advantage of a very large installed base of users. Collecting data from such a large number of users allows the present invention to be able to generate extremely accurate creditworthiness reports, even for smaller companies and for consumers.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

For illustrative purposes, the preferred embodiment of the present invention is described in the context of collection of creditworthiness data, over the Internet, from an installed base of users of an accounting software package. Those skilled in the art will recognize that the particular features of the present invention are not limited to a particular environment, software application, or network configuration, and that the following description is merely intended to be illustrative of one embodiment. The scope of the invention is therefore not intended to be limited by the particular implementation described below, but rather defined solely by the claims.

Figure 1:
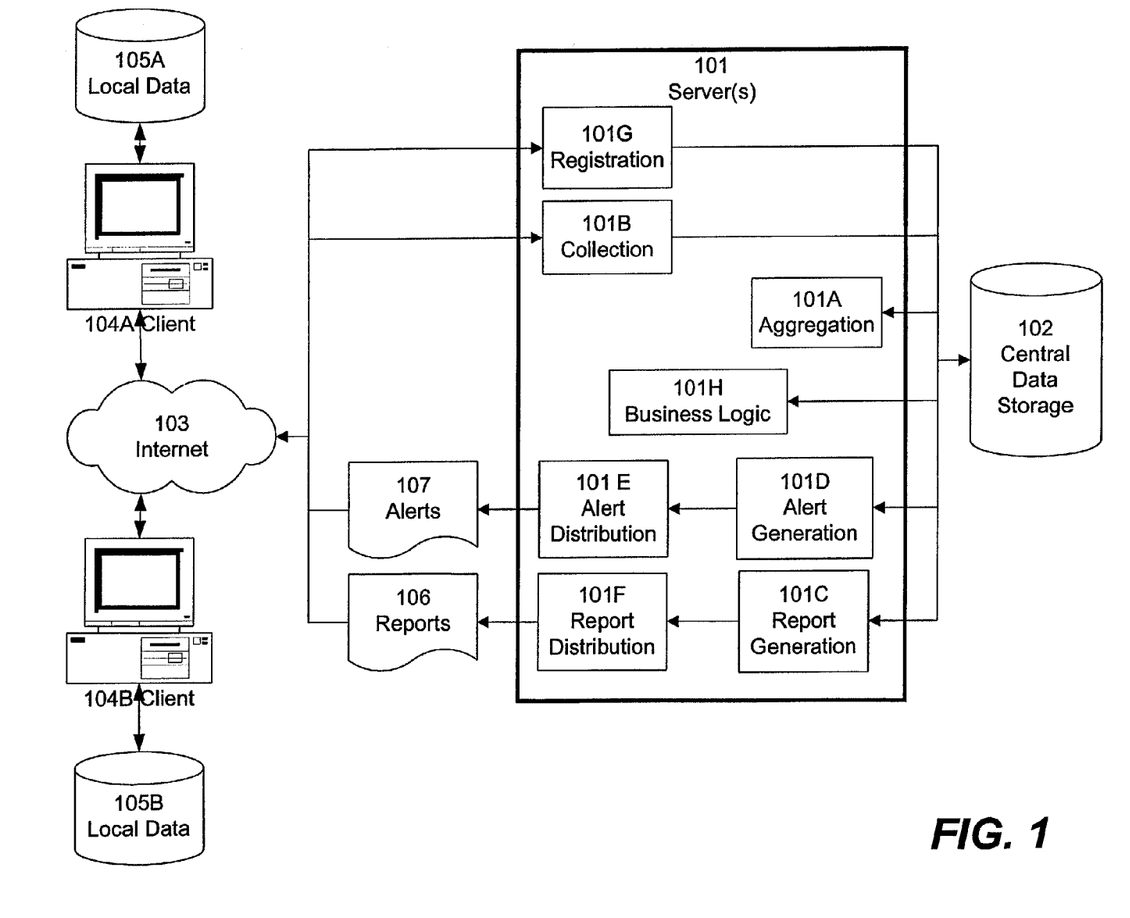
FIG. 1 is a block diagram depicting an overall architecture for an embodiment of the present invention.
Figure 2:
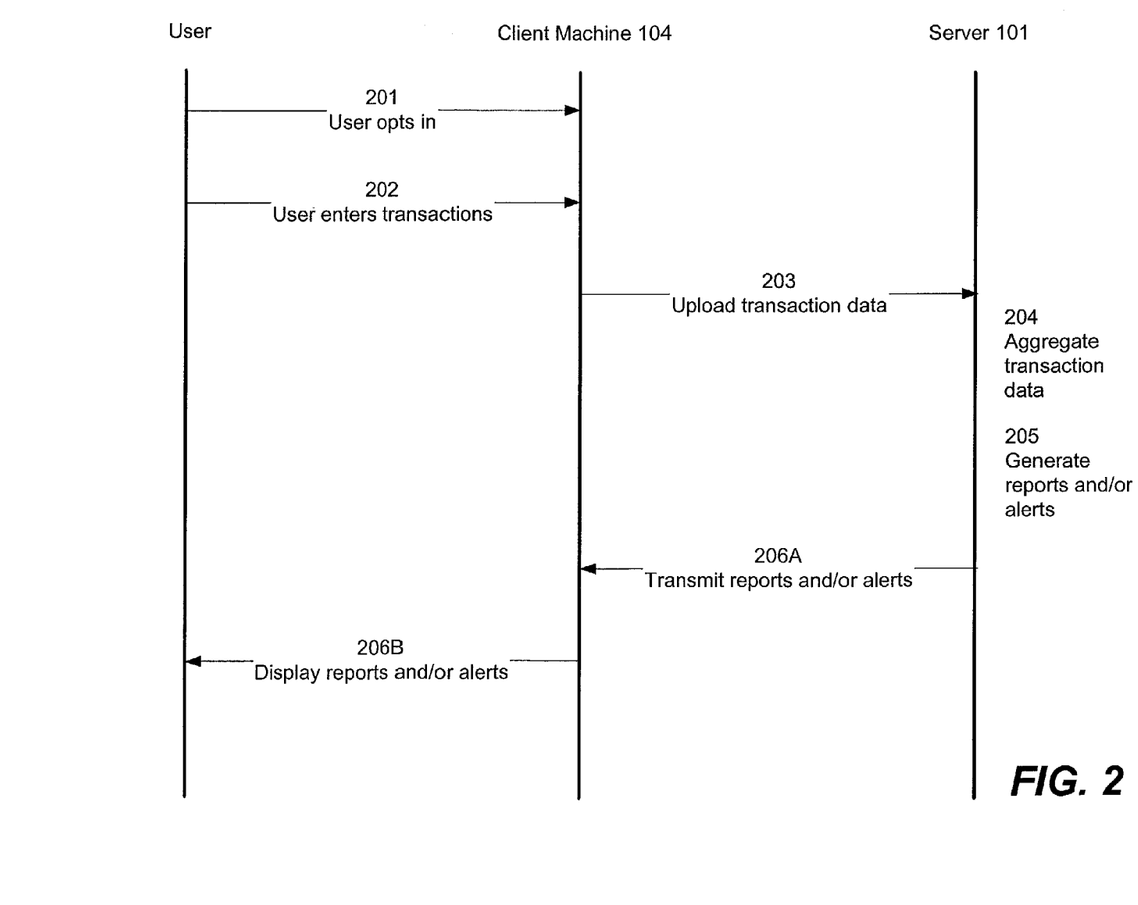
FIG. 2 is an interaction diagram of a method for practicing the present invention.

Referring now to FIG. 1, there is shown a block diagram depicting an overall architecture for an embodiment of the present invention. Referring also to FIG. 2, there is shown an interaction diagram of an overall method for practicing the present invention according to one embodiment. In one embodiment, the invention operates in conjunction with a number of clients 104. Each client 104 may be a conventional desktop computer, including a central processing unit (CPU), display, disk drive, modem, and input devices. One skilled in the art will recognize that laptops, handheld computers, personal digital assistants (PDAs), Internet appliances, and other computing devices may also be clients 104. Each client 104 executes a software application such as an accounting software package, financial software package, accounts receivable software pack-package, or the like. The various clients 104 need not be running the application simultaneously, as data can be collected in an asynchronous manner whenever each client 104 happens to activate the software or open an active connection over which data can be transferred. Each client 104 stores local data 105 relevant to the software application in a conventional manner. Alternatively, for web-based software applications or Application Service Provider (ASP)-based implementations of accounting and financial software, such data may be stored at a remote server, with access to the data being restricted to authorized persons. All clients 104 may use the same software package, or they may use different software packages from one another; where different software packages are used by various clients 104, the software packages may be from the same manufacturer or from different manufacturers. Clients 104 are connected to the Internet 103 or some other centralized network via conventional means (e.g. telephone modem, direct subscriber line (DSL), cable modem, and the like).

In one embodiment, at least a subset of the users are unaffiliated with one another; they are, for example, separate individuals and/or businesses that do not normally share transaction data with one another. Rather than merely collecting transaction data from a number of users (such as employees) affiliated with a single business entity, the present invention collects data from any number of users that may not work together or be otherwise associated with one another. The present invention thereby utilizes a wider cross-section of transaction data, and facilitates generation of more accurate creditworthiness data than would normally be obtainable from transaction data of one business entity alone.

In one embodiment, data collection takes place whenever a user connects to the Internet 103, whether or not the software is active at the time of connection. Such data collection may thus take place via a background transfer. For example, in one embodiment a background process (not shown) is initiated upon operating system startup. The background process continues to operate while the user is engaged in other tasks on the computer. The background process continually monitors the status of the client's network connection to determine a suitable time at which transaction data should be collected. Various parameters may be set for such determination, so that, for example, the data collection does not unduly affect the bandwidth available for other tasks. In general, the background process initiates data collection when it determines that a network connection is available and that sufficient bandwidth is available without interfering with other tasks. Once such a determination is made, the background process initiates a connection to centralized server(s) 101 over the Internet 103. The background process identifies the client machine 104 it is running on, and interacts with server(s) 101 to perform appropriate authentication and handshaking to establish and verify the connection. The background process then transmits transaction data to server(s) 101 over the Internet 303. In one embodiment, the transmission takes place in a secure manner using encryption technology and/or other security and authentication techniques as are known in the art. If, during the data transmission, the connection is lost or the available bandwidth is reduced to a level that does not permit transaction data to be transmitted without unduly affecting other operations, the data transmission is halted. It may then be resumed at a late time, when the connection is available and the conditions for data transfer are more suitable.

In another embodiment, a connection to the Internet may be initiated automatically on a periodic basis so that data can be collected. In yet another embodiment, data collection takes place in response to a user's explicit instruction, or at periodic intervals during a user session. Where a continuous network connection is available, data collection may be performed as frequently as is practicable or desired.

If desired, users may be made aware that data collection is taking place, though such notification is not necessary to practice the present invention. In one embodiment, users are given an opportunity to "opt in" 201, or consent to the collection of accounts receivable and/or transaction data. Users may be asked whether they consent to data collection at the time they install the accounting or financial software. Alternatively, the software may prompt them at periodic intervals. In alternative embodiments, users are prompted for their permission at each instance of data collection. The software may show the user the data being collected, and may give the user the opportunity to approve and/or annotate the data before it is transmitted. Showing users the data being collected may reassure the users that their personal privacy is not being violated. In yet another embodiment, the software defaults to a mode in which data is collected, forcing users to "opt out" if they do not want the data to be collected. In yet another embodiment, the software does not provide users with such options, but collects data from users without requesting or requiring their consent.

Various techniques may be employed for encouraging users of the software to allow their accounts receivable data to be transmitted to central server(s) 101. As described above, those users who consent to the transmission and use of their data may be provided with reports for free or for a reduced rate, and/or may be provided with free or reduced-price software upgrades, access to improved features of the software, and the like. In addition, those users who consent might be given permission to affix a distinctive logo or message on their invoices to debtors, indicating that the sender of the invoice participates in such credit information collection; such a logo or message might encourage debtors to pay such an invoice more promptly, since they would be aware that their payment history is being reported.

Users enter transactions 202 in the software application using data entry screens that are common to conventional accounting or financial software applications. Typically, such data entry is performed over a period of time, as day-to-day transactions take place and are recorded. Transaction data includes, for example: transaction date; invoice date; invoice number; company; description; amount; category; and the like. Transaction data is stored, for example, in local data storage 105 at clients 104, as is known in the art. Alternatively, for web-based software applications or Application Service Provider (ASP)-based implementations of accounting and financial software, such data may be stored at a remote server, with access to the data being restricted to authorized persons. The techniques of the present invention are applicable to either type of architecture and storage scheme.

In one embodiment, server(s) 101 are implemented using any combination of commonly-available web servers as are known in the art. Server(s) include several functional components, including, for example:

data collection module 101B, for collecting, from clients 104, data describing the payment history of subject companies;

data aggregation module 101A, for aggregating the collected data concerning a particular subject company;

report generation module 101C, for generating reports describing creditworthiness of subject companies;

alert generation module 101D, for generating alerts describing creditworthiness of subject companies;

report distribution module 101F, for distributing reports describing creditworthiness of subject companies;

alert distribution module 101E, for distributing alerts describing creditworthiness of subject companies;

registration module 101G, for providing log-in functionality, verifying user identities, and tracking users' interactions with the functionality of the invention; and business logic 101H, for controlling subscription and report access functions.

In one embodiment, data collection module 101B of server(s) 101 of the present invention collects data describing the payment history of companies with which the user has conducted business. This is accomplished by periodically uploading 203 transaction data to server(s) 101. In one embodiment, individual transaction data (e.g., both invoice and payment data), as stored in local data 105, is collected. Alternatively, data for particular companies is aggregated at client 104 and transmitted to module 101B in an aggregated form; such aggregated data may include, for example, accounts receivable aging data. Particulars of subject companies, such as their names, locations, or other identifying information, may also be collected, so as to adequately identify the companies to facilitate aggregation with data collected from other users.

In one embodiment, the data is transmitted in a secure fashion over the Internet 103, using techniques and protocols that are known in the art for such data transfer.

In one embodiment, data is uploaded 203 whenever such transfer is most convenient to the user, such as when a connection to the Internet 103 is established, or when the software application is opened or closed, or when a connection is available and bandwidth is sufficient. In other embodiments, data transmission may be user-initiated or server-initiated.

The data uploaded in 203 may include transaction data itself, or it may include aggregated transaction data that describes payment behavior of those companies with whom the user does business; such aggregated data may be generated, for example, using report construction functionality within the software applications, such as that commonly used for accounts receivable reports. In one embodiment, data is uploaded in an anonymous manner that protects the confidential information of the user.

In one embodiment, once the user opts in 201, transactions that were previously entered (before opt-in) may be uploaded. Thus, the invention is able to "catch up" by collecting data for transactions that took place before optin. In one embodiment, the user is given an opportunity to permit or disallow such an operation. The catch-up upload may take place immediately following receipt of the user's opt-in, or at the same time as the first new transaction is uploaded, or at any other convenient time.

Those skilled in the art will recognize that many other schemes for initiating and scheduling the transmission and collection of the transaction data may be employed without departing from the present invention. In one embodiment, data is transmitted according to techniques and protocols that are known for transmission of data over a network connection. In an ASP-based implementation, data is transmitted from the application's transaction storage device (not shown) to server(s) 101.

Data aggregation module 101A within server(s) 101 aggregates 204 uploaded data, and stores it in central data storage 102 along with data collected from other clients 104. In one embodiment, module 101A aggregates data based on company names as entered by users of the software; thus all collected transaction data for a company named "Acme" would be aggregated by module 101A prior to storing the data in storage 102. In another embodiment, server(s) 101 normalizes the company name information in the uploaded data in order to account for variations in the spellings, formats, and punctuations of entered company names. Server(s) 101 are thereby able to recognize transactions that refer to the same business entity even if the users entered the company name slightly differently. In normalizing for such variations, server(s) 101 may perform various operations such as:

stripping out punctuation and common words such as "the" or "inc.";

matching variations in spelling; and checking for similarity in address, telephone number, e-mail address, domain name, or other company information.

For example, aggregation module 101A would determine that "Office Depot," "The Office Depot," and "Office Depo" all refer to the same company, so that the credit information would be properly aggregated among transactions using all three versions of the name. Other techniques for detecting matches despite variations in entered names are known in the art and may be applied as desired. In addition, in one embodiment the invention avoids erroneously combining data for similarly named entities by checking for matches in addresses, telephone numbers, or other secondary information. Storage 102 may also contain a directory of subject companies, so that when a user enters a transaction identifying a subject company, the directory may be consulted in order to obtain the likely matches to the subject company identified by the user. In yet another embodiment, when a user enters a company name in the course of recording a transaction, the user is presented with a list of likely matches and prompted to select one, so that the correct company is properly identified. If the user indicates that none of the listed companies is correct, a new record for the entered company may be created and stored.

One skilled in the art will recognize that normalization of company names is not necessary to practice the present invention, and that the invention can be implemented without any functionality for detecting close matches among company names.

Aggregated data is stored in central data storage 102. In one embodiment, aggregation 204 includes generating and indexing combined payment history data on a company-by-company basis. Storage 102 may be implemented using known database applications and tools, such as an Oracle database. In one embodiment, storage 102 includes database records for each of a plurality of companies for whom transaction data has been collected and aggregated. For each of these companies, an assessment of creditworthiness, such as for example a quantified creditworthiness rating, is derived. Creditworthiness ratings are determined from collected information using conventional techniques for assessing and quantifying relative credit risk based on payment history; such techniques are well known in the art.

As module 101B of server(s) 101 collects additional data, the data is stored in storage 102 and the creditworthiness ratings for the subject companies are updated accordingly. In one embodiment, creditworthiness ratings are stored along with the aggregated data in storage 102; in another embodiment, creditworthiness ratings are not stored, but are derived from the aggregated data when needed or requested, in real time.

Creditworthiness reports and/or alerts are then generated 205 based on the aggregated transaction data. Such reports include, for example, creditworthiness assessments of selected companies. In one embodiment, report generation module 101C of server(s) 101 generates reports 106 using report generation features of the database application used to store the aggregated data, as is known in the art. Similarly, alert generation module 101D generates alerts 107 describing changes to creditworthiness assessments of subject companies, when such changes are relevant to particular users. Reports 106 and alerts 107 may be generated according to any or all of the following criteria, for example:

on demand, by end users or by system operators;

periodically, according to predefined criteria;

upon occurrence of predetermined triggering events (e.g. a first detected transaction with a particular company); and upon detection of a significant change in a company's creditworthiness rating.

Report distribution module 101F then transmits 206A generated reports 106 to client 104 by whatever means are appropriate and desired, and client 104 displays 206B the reports to the user. Similarly, alert distribution module 101E transmits 206A generated alerts 107 using alert generation features of the database application used to store the aggregated data, as is known in the art. Reports may be made available to selected users, or to the public at large, by publication on a web page, by hard copy printout, by e-mail, or by any other appropriate mechanism. Alternatively, reports may be made available to users in the context of the accounting or financial software application, via a reports command or menu within the application, or via a dialog box provided for requesting creditworthiness data for a company. Business logic 101H may be employed to control subscription and report access functions.

Figure 3:
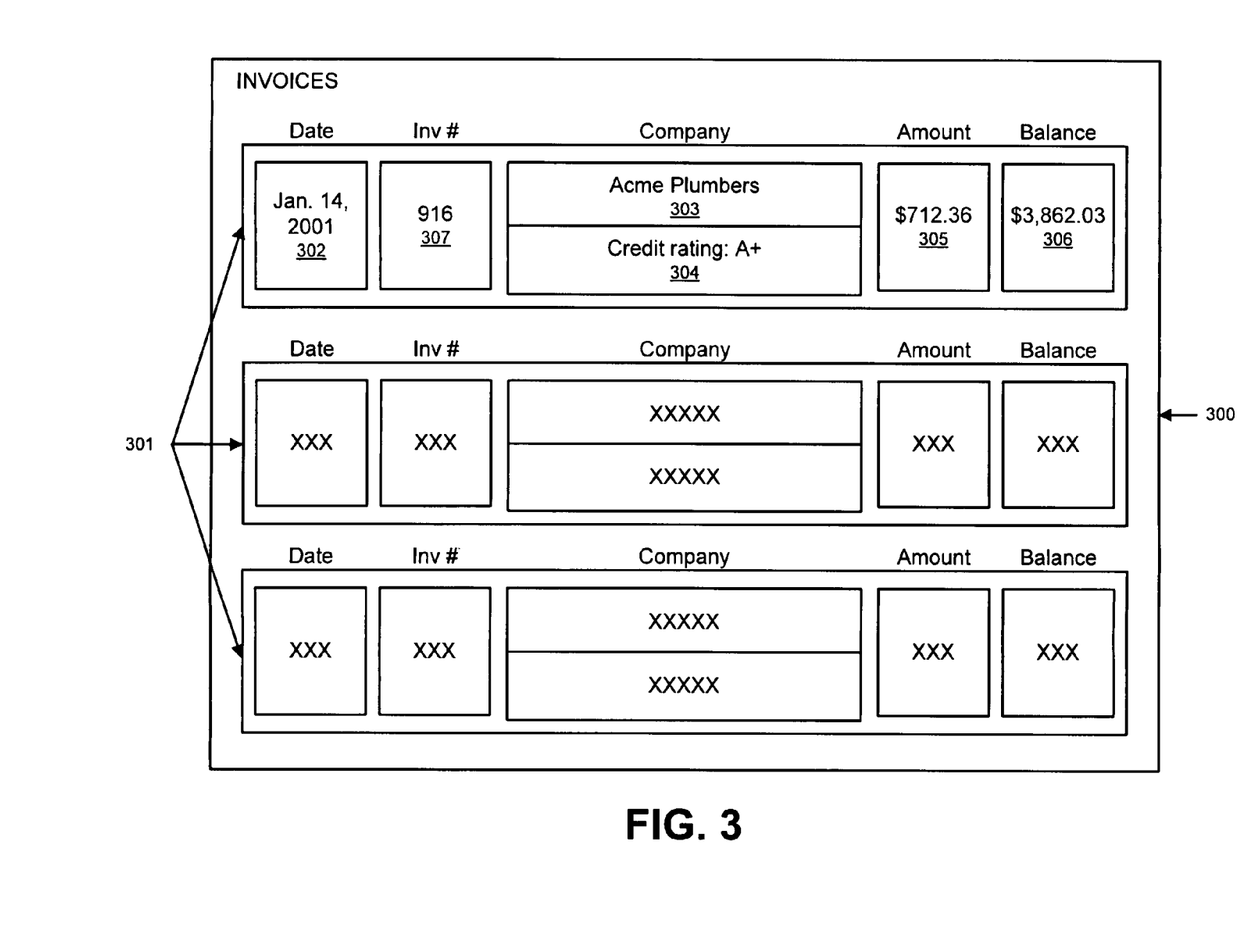
FIG. 3 is an example of a screen shot displaying a creditworthiness rating in the context of a transaction register.

In one embodiment, an indication of a company's creditworthiness rating, as determined based on aggregated data, may be displayed to a user whenever the user enters the company's name in the course of inputting a transaction. Referring now to FIG. 3, there is shown sample screen 300 in which credit rating 304 for a company is displayed alongside other particulars for a transaction 301. In sample screen 300, several transactions 301 (such as invoices) are displayed, each including a date 302, invoice number 307, company name 303, transaction amount 305, and balance 306. Credit rating 304 is displayed alongside the other transaction data, and may be displayed, for example, in response to the user's entry of a company name 303. In one embodiment, the user may click on credit rating 304 to view a more detailed credit report on the subject company.

In one embodiment, credit rating 304 is obtained "on the fly" from server(s) 101 when a user enters a company name. Client 104 recognizes the entered company name and requests the relevant credit rating 304 from server(s) 101. Credit rating 304 may also be stored locally, once obtained from server(s) 101, so that if the user subsequently views the transaction screen client 104 need not make a second request for credit rating 304. In another embodiment, credit ratings for a number of companies (for example, those companies with whom the user does business) may be periodically downloaded and stored locally, so that credit rating 304 can be displayed whenever the user enters a company name or reviews a transaction for a company, without requiring a new request to server(s) 101. Such downloaded information may be updated periodically or in response to alerts from server(s) 101 that a rating has changed.

The numeric rating shown in FIG. 3 is merely an example of one possible representation of a credit rating. Alternatively, an icon or color-coded indicator may be displayed, representing a relative degree of creditworthiness. One skilled in the art will recognize that other types of indicators or representations of credit ratings may be used.

Registration module 101G provides functionality related to registration, identification, and recognition of users. Module 101G provides a log-in screen that prompts users to enter an identifier and password, and further provides the back-end functionality for authenticating user identity based on such entered information. Registration module 101G may also handle collection of payment information (such as credit card numbers) for use of the services associated with the creditworthiness reporting functions, and may also prompt users to enter demographic or other information, for purposes such as tracking, advertisement targeting, and the like. In one embodiment, module 101G maintains a user database, either in central data storage 102 or in another storage device, for storing lists of registered users, and for tracking the activity of such users with respect to the creditworthiness reporting functionality of the present invention. For example, module 101G may track the types of reports a particular user requests, as well as the subject companies of the requested reports, so as to determine what information is of greatest interest to the user. Report generation module 101C and alert generation module 101D can tailor subsequent reports and alerts in response to these interests. Methods and techniques for user registration, login, and tracking are well known in the art.

Business logic 101H, which may be configured by a system operator, specifies in one embodiment which reports should be made available to which users. For example, in one embodiment, reports may be made available only to those users who have subscribed to a reporting service, or who have paid a fee, or who have agreed to allow the system to transmit their accounting data to server(s) 101. Users may elect to "subscribe" to reports for particular companies, or reports may be automatically provided to users, based on lists of companies with whom they regularly do business. Opt-in and/or opt-out functionality may be provided. Subscription data may be stored centrally by server(s) 101 (in which case the appropriate reports are provided and transmitted to subscribed users), or alternatively it may be stored in local data 105 of individual clients 104 (in which case client software makes the requests as to the particular companies to which the user has subscribed). Users can thus subscribe so that they receive updates as to future changes in creditworthiness data for a company, or they may specify single requests of a "one-shot" report on a company. Users are identified and authenticated by registration module 101G, as described above.

As described above, storage 102 may also contain a directory of subject companies. In one embodiment, storage 102 maintains an index that indicates, for each given user, which subject companies are of interest; conversely, the index may indicate, for each subject company, which users are interested in or do business with the company. Alert generation module 101D and report generation module 101C may then consult the indexes in storage 102, in order to determine who should receive particular reports and alerts, and in order to properly tailor such reports according to users' needs and according to the level of service to which they have subscribed. In one embodiment, the parameters for such determination and tailoring are defined and implemented by business logic 101H.

In one embodiment, users may be offered a certain number of subscriptions and one-shot reports for free or for a specified fee, and premium services may also be offered, which allow access to more detailed reports or to a greater number of reports. Additional reports may be offered to collection agencies or other businesses that are interested in creditworthiness data for companies; such reports may be tailored to the particular needs of the businesses. Various structures and business arrangements may be made, and implemented in business logic 101H, for providing access to reports 106 and alerts 107 in various ways. One skilled in the art will recognize that the methodologies described herein are merely exemplary.

For example, a minimal level of information describing a subject company is the credit rating, which may be expressed as a grade (such as A++, A+, A, B, and the like), or as a numeric indicator (such as 8 out of 10), or by any other means. A first tier of reporting service might provide users with this rating, but would not include any further details regarding the subject companies. A second tier might additionally provide summary information concerning subject companies, such as for example the average days the subject company takes to pay an invoice, relative to some common set of terms, such as "Net 30" or the like. A third tier might provide a more detailed chart showing the average days to pay for various invoice amounts or ranges of amounts. Such information might further include useful statistics, such as noting the maximum invoice amount the subject company normally encounters.

Various subscription levels, or tiers, can be implemented by business logic 101H. For example:
  basic tier: ten reports per month;
  deluxe tier: 100 reports per month; or
  premier tier: unlimited reports.

Similar tiers may be established for alerts. Restrictions may be placed on access to reports on subject companies with whom the user has never transacted, if desired; alternatively, such restrictions may only be enforced on users that are subscribed to lower tiers of service.

Reports and alerts may be made available for free for a limited time, if desired, as a promotional vehicle.

In one embodiment, report distribution 101F may transmit alerts, such as by e-mail or by some other communication means, describing updated creditworthiness assessments. Such alerts may be transmitted to those clients 104 that have previously conducted business with the subject company, or who have otherwise indicated an interest in the subject company (for example, by subscribing to reports for that company). In one embodiment, the alert identifies the subject company, includes a brief description of the change in the credit rating, and provides a hyperlink to a more detailed report as may be made available via a web page. Clicking on the link generates a request to server(s) 101 to prepare and transmit the appropriate report to client 104 as a web page. In this manner, a user is informed if there has been a significant change in creditworthiness assessment for a particular company with which the user does business, and the user is given an opportunity to access more detailed information regarding the change and the underlying historical data.

In one embodiment, the selection of which reports and/or alerts to provide to which users may also be adjusted based on geographic considerations. For example, users known to be marketing their products or services in a particular geographic region and to a particular type of company may be presented with creditworthiness reports and/or alerts for companies within that region and of that type. Geographic regions may be defined by any known technique, such as ZIP code, city, state, and the like. Geographic data for a subject company may be extracted from a stored record (which would contain such information as previously entered by the user), or such data may be retrieved from a directory or other data source. Geographic data for a particular user may be determined, for example, if the user is queried for such information by the client software application, e.g. at initialization or installation of the application.

Creditworthiness data as collected and aggregated by the present invention may also be used in assessing the value of a company's receivables for the purpose of factoring. Factoring is the sale of an account receivable. The factor pays cash for the receivable, exchanging one asset (cash) for another asset (an account receivable). The creditor need no longer wait for receivables to be paid by the debtor. Typically the purchase price for the account receivable is discounted from the amount actually owed by the debtor. The creditworthiness data generated by the present invention may be used to determine the relative risk associated with the account receivable and thereby establish an appropriate purchase price.

By collecting transaction data directly from an installed base of users of a financial or accounting software package, the present invention advantageously facilitates aggregation of large quantities of transaction history data, and thus enables generation and distribution of more accurate creditworthiness reports with a minimum of user effort and cost. The invention further facilitates distribution of such reports to those users who are most likely to be interested in the information contained therein, and provides the capability to tailor the reports to the needs of individual users.

In one embodiment, the transaction data is collected in such a manner that the source of the data remains anonymous. Thus, companies whose creditworthiness rating is adversely affected by reported data are unable to track the source of the data. However, in an alternative embodiment, a mechanism may be put in place for allowing subject companies to determine the source of such transaction data, particularly in a situation where the adverse data is erroneous. For example, the provider of the service may keep track of transaction data sources, and may divulge source information to subject companies only when it appears that an error has been made. Other schemes may also be provided; for example, source information may be provided to those companies that pay a higher fee, or it may be provided only when the source has indicated that it is willing to share such information, or according to any other desired criterion. Depending on the nature of the application, one skilled in the art will recognize that different schemes for providing and/or protecting such information may be appropriate.

Referring now to FIGS. 4a through 4d, there are shown interaction diagrams depicting various operations that may be performed according to one embodiment of the present invention. The particular sequence of requests, responses, and other communications depicted in FIGS. 4a through 4d are merely exemplary, and are not intended to limit the scope of the invention claimed herein.

Figure 4A:
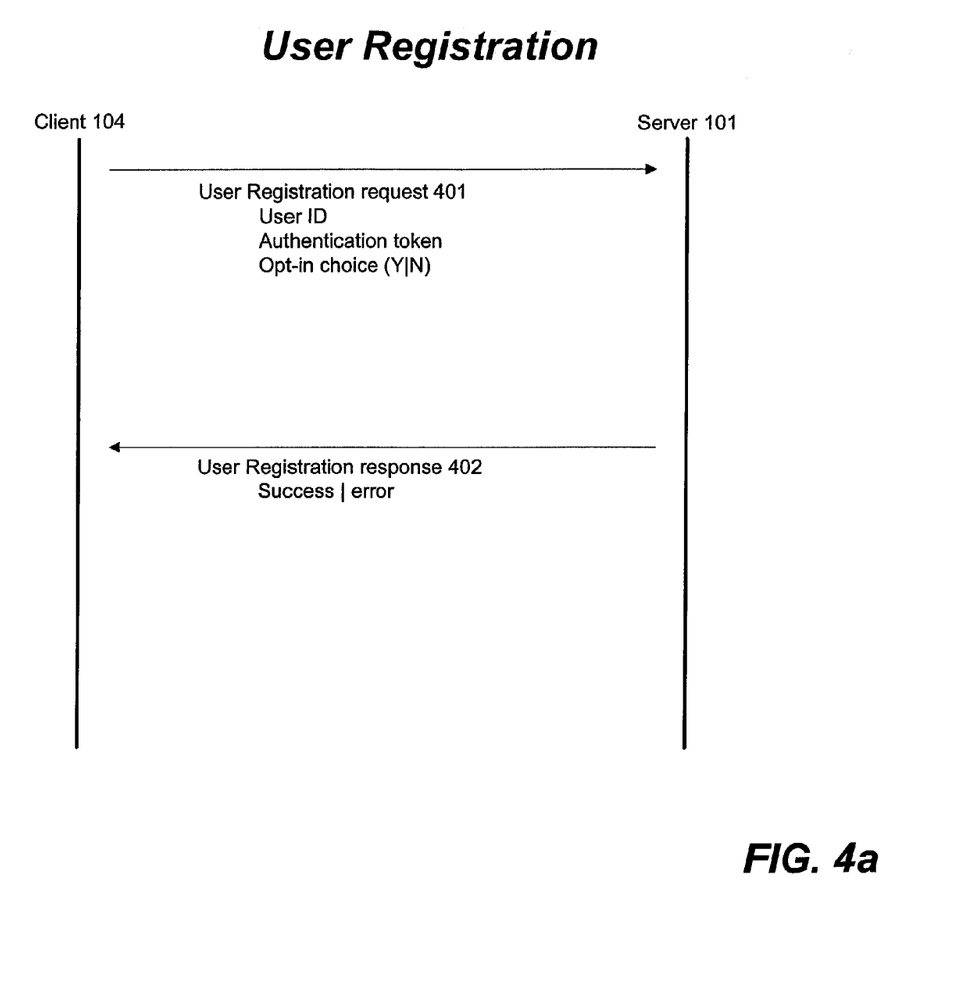
FIG. 4a is an interaction diagram depicting user registration according to one embodiment of the present invention.

FIG. 4a depicts a user registration operation. Such an operation is performed, for example, when a new user signs on to the creditworthiness reporting system, or when such a user initially agrees that his or her transaction information is to be collected by the system of the present invention. In such a situation, the user may be given the opportunity to select and provide a login identifier and a password, as well as other information. User registration may also take place when a returning user signs on with a pre-selected login identifier and password, and is thereby recognized by the system of the present invention.

Client 104 transmits a user registration request 401 to server 101. Request 401 includes a user identifier (such as a log-in), and an authentication token (such as a password). Request 401 may also include an indication as to whether or not the user would like to "opt in" to the data collection performed by the system of the present invention. If this is the user's first interaction with the system, additional information, such as e-mail address, type of business, demographic information, and the like, may also be collected. The user may be prompted for such additional information at the time of request 401, or in a follow-up communication.

According to the architecture described above, such a request 401 would be handled by registration module 101G of server 101. If the user's identifier is recognized and the authentication token is verified, server 101 responds 402 to request 401 with an indication of success. If a new user successfully provides requested information, server 101 also responds 402 with an indication of success. If the user's identifier is not recognized, or if the authentication token is not verified, or if requested information is not provided, server 101 responds with an error indication. When such an error occurs, an exception report may be generated, and the user may be asked to re-enter the requested information. The number of retry attempts may be limited, if desired, for security purposes.

Figure 4B:
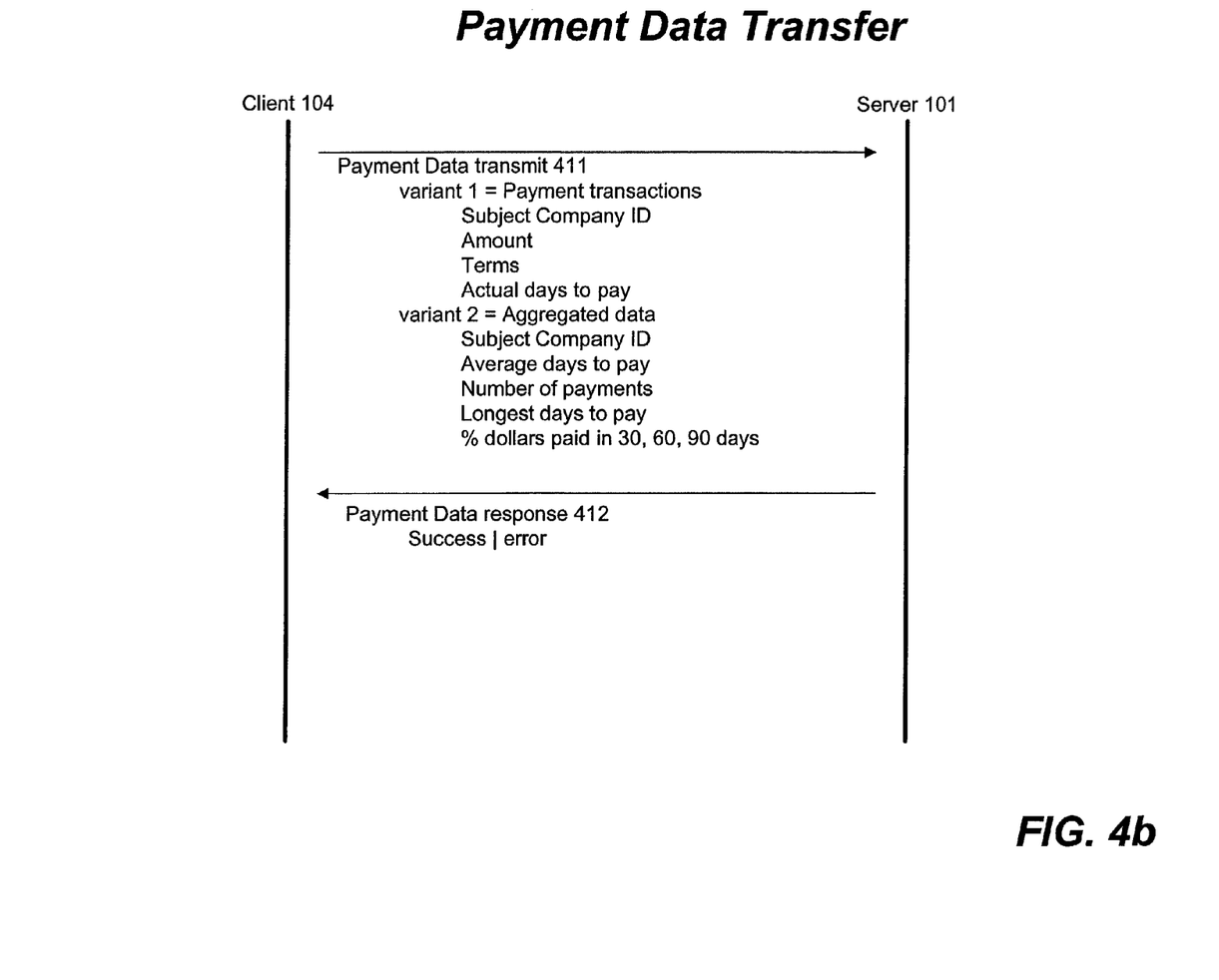
FIG. 4b is an interaction diagram depicting payment data transfer according to one embodiment of the present invention.

FIG. 4b depicts a payment data transfer operation. Such an operation is performed, for example, when transaction data is to be collected from client 104 with respect to a subject company. For example, when a user enters a transaction into an accounting software package, relevant transaction data may be transferred to server 101. Alternatively, such information may be stored locally at client 104, and transferred to server 101 in a "batch" operation at periodic intervals.

Client 104 transmits payment data 411. In one embodiment, payment data describes one or more individual transactions with respect to a subject company. Transmission 411 may include, for example, a subject company identifier, the amount of the transaction; the terms, and the actual days to pay for the transaction. Other information may also be transmitted, as appropriate for the particular embodiment.

In an alternative embodiment, payment data is transmitted in an aggregated form, so as to combine information from a number of transactions. Transmission 411 may then include, for example, a subject company identifier, an average days to pay for the subject company, and the number of payments received from the subject company. One skilled in the art will recognize that other types of aggregated data may be provided in addition to or instead of the above-described items.

Server 101 transmits a payment data response 412 acknowledging receipt of transmission 411. Response 412 indicates "success" or "error" for the receipt of transmission 411. In the case of an error, client 104 may retransmit the information. An error log may also be generated to track such errors.

Figure 4C:
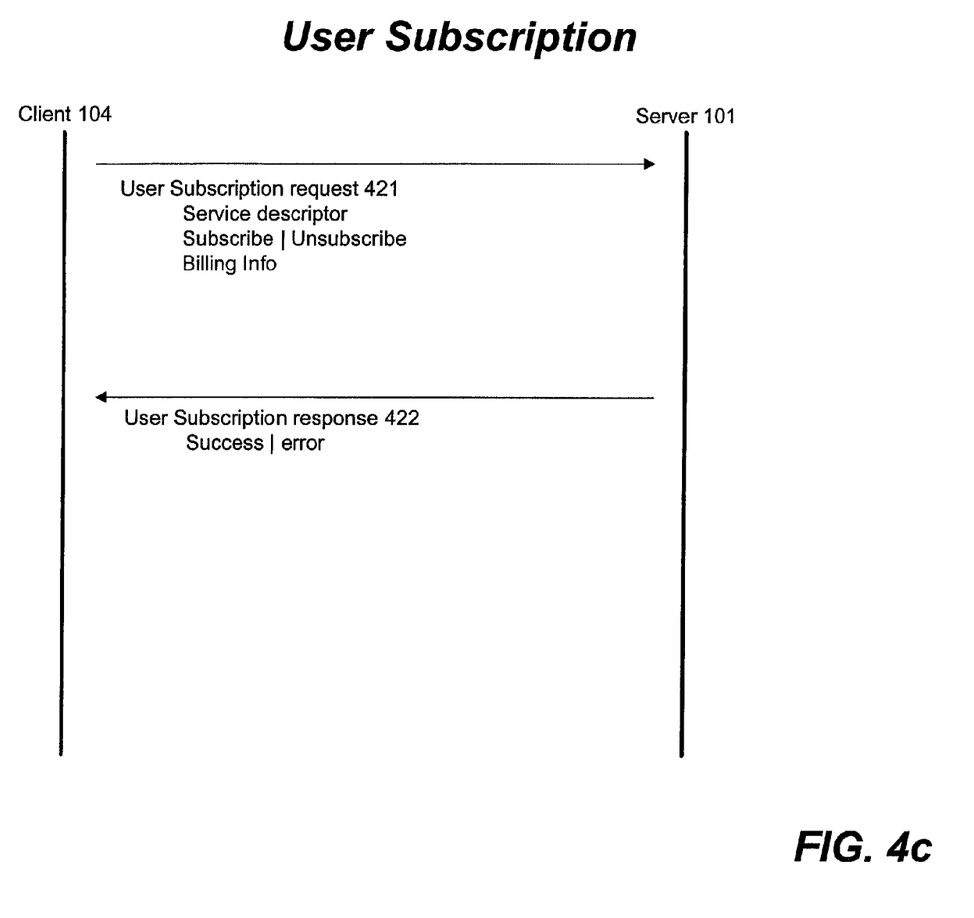
FIG. 4c is an interaction diagram depicting user subscription according to one embodiment of the present invention.

FIG. 4c depicts a user subscription operation. Such an operation is performed, for example, to handle user requests to subscribe to creditworthiness reports, or to maintain and/or modify existing subscriptions.

Client 401 transmits a subscription request 421. Request 421 contains, for example, a description or code specifying the type of service to which the client wishes to subscribe. In one embodiment, several different tiers of service are available, as described above. Request 421 may also specify the particular companies the user is interested in. Request 421 also indicates whether the user wishes to subscribe, unsubscribe, or modify an existing subscription. In addition, request 421 may include billing information, such as a credit card, for payment of fees associated with the subscription. Alternatively, such billing information may be collected as part of the registration process described above in connection with FIG. 4a.

Server 101 transmits a user subscription response 422 acknowledging receipt of request 421. Response 422 indicates "success" or "error" for the receipt of request 421. In the case of an error, client 104 may retransmit the information. An error log may also be generated to track such errors.

Once a subscription request has been received and acknowledged, server 101 may transmit reports and/or alerts at periodic intervals, or when creditworthiness information changes for a subject company, or when other events occur, according to the specifics of the particular embodiment of the invention.

Figure 4D:
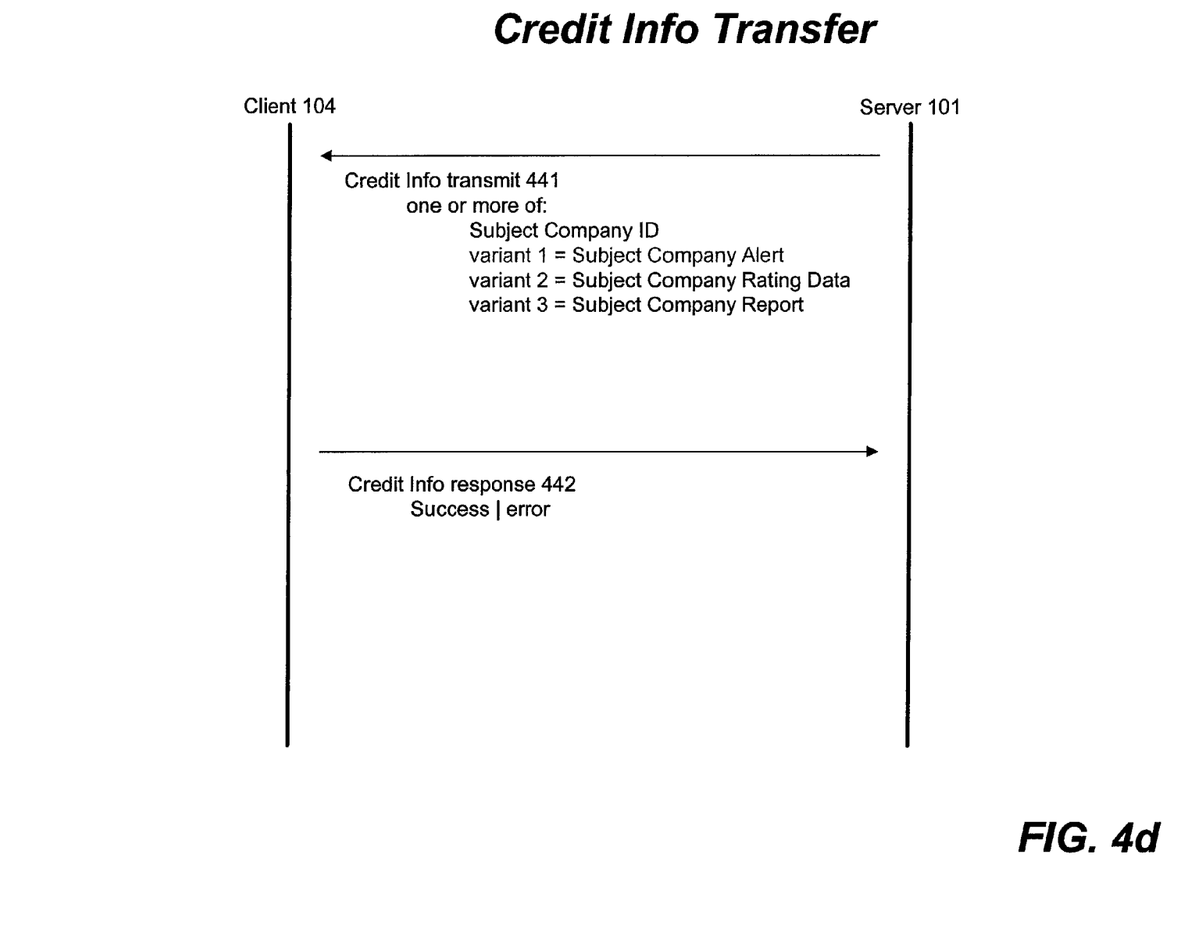
FIG. 4d is an interaction diagram depicting credit information transfer according to one embodiment of the present invention.

FIG. 4d depicts a credit information transfer operation. Such an operation is performed, for example, as part a subscription as established according to the subscription operation described in FIG. 4c. Alternatively, such an operation is performed in response to a user's "one-off" request for credit information on a particular company. Such "one-off" requests may be provided for a set fee, or a limited number of such requests may be made available to each user at no charge.

Server 101 transmits credit information for a subject company 441 to client 104. Transmission 441 may take any of several forms, including for example:

an alert concerning a subject company;
an indication of the rating data for a subject company; and/or
a creditworthiness report for a subject company.

Depending on the type of service to which the user has subscribed, various alerts, reports, and data may be transmitted, either automatically or by user request.

In one embodiment, client 104 transmits a credit information response 442 acknowledging receipt of transmission 441. Response 442 indicates "success" or "error" for the receipt of transmission 441. In the case of an error, server 101 may retransmit the information. An error log may also be generated to track such errors.

As will be understood by those familiar with the art, the invention may be embodied in other specific forms without departing from the spirit or essential characteristics thereof. For example, other techniques for collecting and aggregating creditworthiness data from clients may be implemented without departing from the present invention. Likewise, the particular capitalization or naming of the modules, protocols, features, attributes, or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

What is claimed is:

1. A computer-implemented method for collecting and aggregating creditworthiness data describing a subject company, comprising:

from a plurality of client machines each running an accounting software application and operated by different users, receiving transaction data for a plurality of companies comprising the subject company;

for each company of the plurality of companies, aggregating transaction data from the plurality of client machines using a processor to obtain aggregated transaction data;

determining, using the processor, a creditworthiness rating of the subject company based on aggregated transaction data;

generating, using the processor, a creditworthiness report for the subject company based on the creditworthiness rating;

receiving a request from a user for the creditworthiness report;

determining whether the user is authorized to receive the creditworthiness report; and responsive to the user being authorized to receive the creditworthiness report, outputting the creditworthiness report, wherein at least a subset of the different users are unaffiliated with one another.

2. The method of claim 1, further comprising generating a credit history report based on aggregated transaction data.

3. The method of claim 1, further comprising:

transmitting the creditworthiness report to a set of users designated as subscribers to the creditworthiness report.

4. The method of claim 1, wherein transaction data comprises locally aggregated data describing company payment histories.

5. The method of claim 1, wherein aggregating transaction data for the subject company comprises normalizing subject company identifiers to account for variations in naming the subject company.

6. The method of claim 1, wherein receiving transaction data comprises:

receiving indications as to whether users of the plurality of client machines assent to data collection; and receiving transaction data from those of the plurality of client machines for which user assent was received.

7. The method of claim 1, further comprising, responsive to an indication of user assent being received from the user, permitting the user to use a mark signifying that the user participates in a creditworthiness data collection effort.

8. The method of claim 1, further comprising outputting, within the accounting software application, an indication of the creditworthiness rating for the subject company.

9. The method of claim 1, further comprising, responsive to at least one predefined criterion with respect to the subject company, outputting to the user an indication of the creditworthiness rating for the subject company.

10. The method of claim 9, wherein the at least one predefined criterion comprises at least one selected from a group consisting of:
- the creditworthiness rating having changed by at least a predetermined amount;
- a length of time since the indication was most recently outputted;
- the user having at least a predetermined number of transactions involving the subject company within a predetermined time period;
- the subject company being located within a defined geographic region with respect to the user;
- the user having indicated an interest in the subject company;
- a type of business of the subject company being related to that of the user; and
- the type of business of the subject company being related to that of other customers of the user.

11. The method of claim 1, further comprising, responsive to the creditworthiness rating, generating a factoring valuation for the subject company.

12. The method of claim 1, wherein transaction data comprises at least one selected from a group consisting of:
- a transaction date;
- an invoice date;
- an invoice number;
- a name of the subject company;
- a transaction description;
- a transaction amount; and
- a transaction category.

13. The method of claim 1, wherein outputting the creditworthiness report comprises transmitting an alert to the user.

14. A system for collecting and aggregating creditworthiness data describing a subject company, comprising:
- a processor;
- a memory operatively connected to the processor and comprising:
  - a data collection module, for receiving from a plurality of client machines, each running an accounting software application and operated by different users, transaction data for a plurality of companies comprising the subject company;
  - a data aggregation module, coupled to the data collection module, for:
    - for each company of the plurality of companies, aggregating transaction data from the plurality of client machines to obtain aggregated transaction data, and
    - determining a creditworthiness rating of the subject company based on aggregated transaction data;
  - a report generation module, for generating a creditworthiness report for the subject company based on the creditworthiness rating; and
  - a report distribution module, for:
    - receiving a request from a user for the creditworthiness report,
    - determining whether the user is authorized to receive the creditworthiness report, and
    - responsive to the user being authorized to receive the creditworthiness report, outputting the creditworthiness report,
- wherein at least a subset of the different users are unaffiliated with one another.

15. The system of claim 14, wherein the report generation module is further for generating a credit history report based on aggregated transaction data.

16. The system of claim 14, wherein the report distribution module is further for transmitting the creditworthiness report to a set of users designated as subscribers to the creditworthiness report.

17. The system of claim 14, wherein transaction data comprises locally aggregated data describing company payment histories.

18. The system of claim 14, wherein the data aggregation module is further for normalizing subject company identifiers to account for variations in naming the subject company.

19. The system of claim 14, wherein receiving transaction data by the data collection module comprises:
- receiving indications as to whether users of the plurality of client machines assent to data collection; and
- receiving transaction data from those of the plurality of client machines for which user assent was received.

20. The system of claim 14, wherein the accounting software application comprises functionality for outputting, within the accounting software application, an indication of the creditworthiness metric for the subject company.

21. The system of claim 14, wherein the report generation module is further for, responsive to at least one predefined criterion with respect to the subject company, outputting to the user an indication of the creditworthiness metric for the subject company.

22. The system of claim 21, wherein the at least one predefined criterion comprises at least one selected from a group consisting of:
- the creditworthiness rating having changed by at least a predetermined amount;
- a length of time since the indication was most recently outputted;
- the user having at least a predetermined number of transactions involving the subject company within a predetermined time period;
- the subject company being located within a defined geographic region with respect to the user;
- the user having indicated an interest in the subject company;
- a type of business of the subject company being related to that of the user; and
- the type of business of the subject company being related to that of other customers of the user.

23. The system of claim 14, wherein the report generation module is further for, responsive to the creditworthiness rating, generating a factoring valuation for the subject company.

24. The system of claim 14, wherein transaction data comprises at least one selected from a group consisting of:
- a transaction date;
- an invoice date;
- an invoice number;
- a name of the subject company;
- a transaction description;
- a transaction amount; and
- a transaction category.

25. The system of claim 14, wherein outputting the creditworthiness report by the report generation module comprises using an alert generation module to transmit an alert to the user.

26. A computer-readable medium comprising computer-readable code executable on a computer, the computer-readable code comprising instructions to:
- receive, from a plurality of client machines, each running an accounting software application and operated by different users, transaction data for a plurality of companies comprising the subject company;

aggregate, for each company of the plurality of companies, transaction data from the plurality of client machines to obtain aggregated transaction data;

determine a creditworthiness rating of the subject company based on aggregated transaction data;

generate a creditworthiness report for the subject company based on the creditworthiness rating;

receive a request from a user for the creditworthiness report;

determine whether the user is authorized to receive the creditworthiness report; and responsive to the user being authorized to receive the creditworthiness report, output the creditworthiness report, wherein at least a subset of the different users are unaffiliated with one another.

27. The computer-readable medium of claim 26, further comprising computer-readable code adapted to generate a credit history report based on aggregated transaction data.

28. The computer-readable medium of claim 26, further comprising computer-readable code adapted to transmit the creditworthiness report to a set of users designated as subscribers to the creditworthiness report.

29. The computer-readable medium of claim 26, wherein transaction data comprises locally aggregated data describing company payment histories.

30. The computer-readable medium of claim 26, wherein computer-readable code adapted to aggregate transaction data for the subject company comprises computer-readable code adapted to normalize subject company identifiers to account for variations in naming the subject company.

31. The computer-readable medium of claim 26, wherein computer-readable code adapted to receive transaction data comprises computer-readable code adapted to:
    receive indications as to whether users of the plurality of client machines assent to data collection; and
    receive transaction data from those of the plurality of client machines for which user assent was received.

32. The computer-readable medium of claim 26, further comprising computer-readable code adapted to, responsive to an indication of user assent being received from the user, permit the user to use a mark signifying that the user participates in a creditworthiness data collection effort.

33. The computer-readable medium of claim 26, further comprising computer-readable code adapted to output, within the accounting software application, an indication of the creditworthiness metric for the subject company.

34. The computer-readable medium of claim 26, further comprising computer-readable code adapted to, responsive to at least one predefined criterion with respect to the subject company, output to the user an indication of the creditworthiness metric for the subject company.

35. The computer-readable medium of claim 34, wherein the at least one predefined criterion comprises at least one selected from a group consisting of:
    the creditworthiness rating having changed by at least a predetermined amount;
    a length of time since the indication was most recently outputted;
    the user having at least a predetermined number of transactions involving the subject company within a predetermined time period;
    the subject company being located within a defined geographic region with respect to the user;
    the user having indicated an interest in the subject company;
    a type of business of the subject company being related to that of the user; and
    the type of business of the subject company being related to that of other customers of the user.

36. The computer-readable medium of claim 26, further comprising computer-readable code adapted to, responsive to the creditworthiness rating, generate a factoring valuation for the subject company.

37. The computer-readable medium of claim 26, wherein transaction data comprises at least one selected from a group consisting of:
    a transaction date;
    an invoice date;
    an invoice number;
    a name of the subject company;
    a transaction description;
    a transaction amount; and
    a transaction category.

38. The computer-readable medium of claim 26, wherein computer-readable code adapted to output the creditworthiness report comprises computer-readable code adapted to transmit an alert to the user.

* * * * *